United States Patent [19]
Kuhlman

[11] Patent Number: 5,659,620
[45] Date of Patent: Aug. 19, 1997

[54] EAR MICROPHONE FOR INSERTION IN THE EAR IN CONNECTION WITH PORTABLE TELEPHONE OR RADIOS

[76] Inventor: Peer Kuhlman, 16 Strandvangsvej, DK-2650, Hvidovre, Denmark

[21] Appl. No.: 397,230
[22] PCT Filed: Sep. 3, 1993
[86] PCT No.: PCT/DK93/00285
  § 371 Date: Mar. 10, 1995
  § 102(e) Date: Mar. 10, 1995
[87] PCT Pub. No.: WO94/06255
  PCT Pub. Date: Mar. 17, 1994

[30] Foreign Application Priority Data

Sep. 10, 1992 [DK] Denmark .................. 1115/92

[51] Int. Cl.$^6$ .................................. H04R 25/00
[52] U.S. Cl. ................ 381/68; 381/151; 381/173; 381/68.3
[58] Field of Search ............ 381/68, 68.3, 68.6, 381/69, 68.2, 68.7, 68.1, 68.5, 68.4, 151, 173

[56] References Cited

U.S. PATENT DOCUMENTS

| 3,869,584 | 3/1975 | Wilde . | |
|---|---|---|---|
| 4,109,116 | 8/1978 | Victoreen | 381/68 |
| 5,295,193 | 3/1994 | Ono | 381/68.3 |
| 5,390,254 | 2/1995 | Adelman | 381/68 |

FOREIGN PATENT DOCUMENTS

| 2810716 | 9/1979 | Germany . | |
|---|---|---|---|
| 4019529 | 1/1991 | Germany . | |
| 0496599 | 3/1992 | Japan | 381/151 |
| 9114350 | 9/1991 | WIPO . | |

OTHER PUBLICATIONS

Michio Jinno, "Microphone" vol. 7 No. 272 E-214, Abstract of Japan 58-153490, Sep. 12, 1983.
Takeshi Yoshii, "Magnetic Bone Conduction And Eardrum Oscillation Microphone in Common use of Transmission and Reception", vol. 8 No. 21 E-224, Abstract of Japan 58-182398, Oct. 25, 1983.

Primary Examiner—Curtis Kuntz
Assistant Examiner—Duc Nguyen
Attorney, Agent, or Firm—Browdy and Neimark

[57] ABSTRACT

An ear microphone includes a holder (2) adapted to be disposed and retained entirely in a wearer's outer ear region, that is, outside the wearer's auditory meatus (ear canal), and, a microphone unit (4) mounted in the rim of the holder for reception of speech sounds transmitted through the wearer's tissue from the jawbone. The microphone unit is mounted in a portion of the edge of the holder (2) facing the bottom of the wearer's tragus when the holder is worn in the ear, disposed in the wearer's outer ear region. The microphone unit is insensitive to airborne sounds by having a rubber cover. Sound blocking is included between the microphone unit and a sound generator placed in the holder adjacent to the ear canal.

19 Claims, 3 Drawing Sheets

EAR MICROPHONE FOR INSERTION IN THE EAR IN CONNECTION WITH PORTABLE TELEPHONE OR RADIOS

FIELD OF THE INVENTION

The present invention relates to an ear microphone comprising a microphone unit mounted in a holder for reception of speech sounds transmitted by tissue from the wearer, the microphone unit being insensitive to airborne sound signals.

DESCRIPTION OF THE RELATED ART

DK-B-159190 discloses an earplug designed for arrangement in the auditory meatus thereby requiring individual adjustment. The arrangement in the inner ear causes various drawbacks that in addition to the individual adjustment are an uncomfortable feeling of pressure in the auditory meatus, sweat in the ear, pollution by cerumen, loss of sense of sound localization when one auditory meatus is blocked etc. The earplug is deliberately designed to suppress sound (noise) coming from the outside. The microphone must be sensitive to airborne sound signals as the signals arrive at the microphone through internal ducts from the area of the plug the exterior of which is provided with recesses to absorb the sound signals from the soft tissue in the auditory meatus.

From GB-A-2 197 158 an ear telephone is known which is designed for being plugged into the auditory meatus. Possibly, the vibration transducer is a piezoelectric element. The design seems to imply that the whole holder is set to vibration, and since the holder is relatively heavy, the consequence must necessarily be that the sound transmission must be of a lowpass nature.

DK 135480 discloses a holder designed to cover the whole ear and consequently, it cannot be worn discreetly. The microphone is a pressure-gradient microphone that has to be in contact with the jawbone i front of the ear. This can only be obtained by strapping the microphone on to the head.

DE 4019529 A1 discloses an ear microphone receiving and transmitting the sound via the jawbone in front of the ear, and likewise a clamp across the head is required.

EP-B-0 092 822 discloses a device also designed for being pressed into the auditory meatus—like GB-A-2 197 158.

SUMMARY OF THE INVENTION

The object of this invention is to avoid the above-mentioned drawbacks of the known ear microphones. This is achieved by an ear microphone characterized in that the holder is designed for arrangement in its entirety in the outer ear outside the auditory meatus, and the microphone unit being mounted in vibration transmitting tissue contact in a part of the edge of the holder facing the bottom of tragus. Thus, it is obtained that when the holder can be positioned in the outer ear outside the auditory meatus, individual adjustment is avoided, easy insertion into the ear is achieved and the holder is not being smeared with cerumen. Furthermore, a better comfort is obtained, and an inconvenient feeling of pressure in the auditory meatus as well as sweat in a plugged auditory meatus is avoided. Moreover, outer sounds are not necessarily totally shut off.

When people talk, vibrations in the throat and vocal cords are generated. These vibrations propagate through the bony and liquid-filled tissue. Especially the jawbone which passes near the front part of the outer ear produces a strong transmission and transfers considerably more "teeth sounds" than if the signal was collected in the throat.

For an ear microphone to be used for full duplex, sufficient separation between input and output must be present in order to avoid self-resonance.

In order to increase the separation in the ear microphone, the sensitivity to vibrations can be increased, and the sensitivity to acoustic sounds can be decreased. Thus, a microphone being unable to hear anything is desirable. At the same time, this results in the advantage of suppression of the surrounding noise. Therefore, the entire holder may advantageously be made of a heavy vibration-absorbing material having a density greater than 2 g/cm$^3$, such as a metal.

A microphone having a tight rubbery coating is very sensitive to movements of the coating. The air pressure produced underneath the coating cannot escape for which reason a strong sound pressure is produced on the microphone membrane.

If the area of the coating (h×w) is large compared to the volume (t×h×w), the sensitivity can be geared. The sound pressure is proportional to $$\frac{\text{area} \times \text{movement}}{\text{volume}} = \frac{(h \times w \times \Delta t)}{(h \times w \times t)}$$

This relation is useful only to low source impedance action on the rubber coating, e.g. direct skin contact and not air. Further, the relatively large mass compared to air of the rubber coating attenuates about 25 dB of airborne sound.

The microphone of the ear microphone is a standard microphone unit, the sound pressure sensitive face (wall) of which is substantially hermetically covered by a coating of flexible material. In use, the coating is in vibration transmitting contact with the tissue. This coating renders the microphone substantially insensitive to airborne sound and due to the soft material, the ear microphone becomes pleasant to wear.

Therefore, the ear microphone can be used in noisy surroundings without transferring any appreciable noise to the microphone which receives the vocal sound by direct transfer through the bottom of the ear at tragus.

The ear microphone is preferably provided with low-frequency cutoff. Due to the tissue transmitted sound spectrum in which low-frequency content is dominating, it is advantageous having the low-frequency dominance removed already in the receiving phase as this low-frequency dominance may cause overamplification in the electrical system.

The ear microphone may be used in a full duplex ear communication unit by having a softly suspended electroacoustic sound generator mounted in a side of the holder facing the auditory meatus.

Thus, the ear microphone may be used for e.g. portable telephones in cars under which circumstances it is desirable that the user during the conversation can have both hands free to manoeuvre the car.

Similarly, the ear microphone may advantageously be used for simplex radiophones, e.g. by the police and fire brigade, wherein the unit in the ear may be worn hidden under the helmet or face guard without being inconvenient during the work.

In the ear microphone, a relatively heavy vibration absorbing insert reducing vibrations from the electroacoustic sound generator to the microphone may be mounted in an area of the holder between the sound generator and the microphone unit.

BRIEF DESCRIPTION OF THE DRAWING

The present invention will now be explained with reference to the accompanying drawing, wherein.

DETAILED DESCRIPTION OF THE PREFERRED EMBODIMENT

Figure 1:
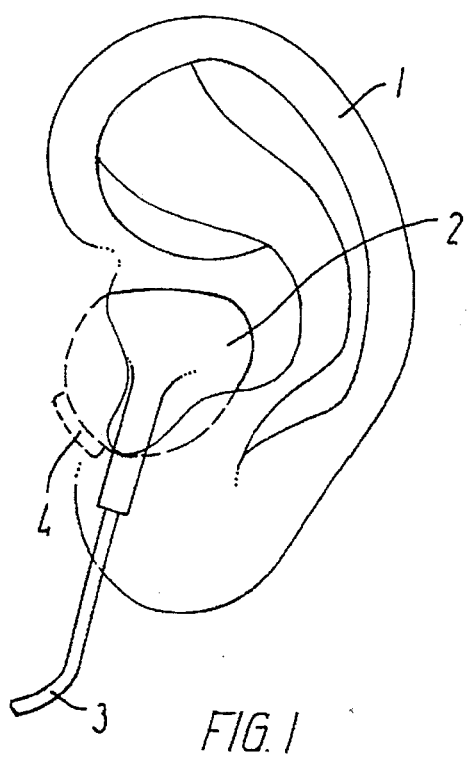
FIG. 1 shows the ear microphone positioned in the left ear, FIG. 1a the ear microphone removed from the ear, FIG. 2 the position of the units in the ear microphone, FIG. 2a the position of a microphone coating in the ear microphone, FIG. 3 the microphone unit seen from the side with spacing foam and microphone attenuation coating FIG. 3a the microphone unit with microphone attenuation coating glued thereto, and FIG. 4 the design concept of the ear microphone.
Figure 1A:
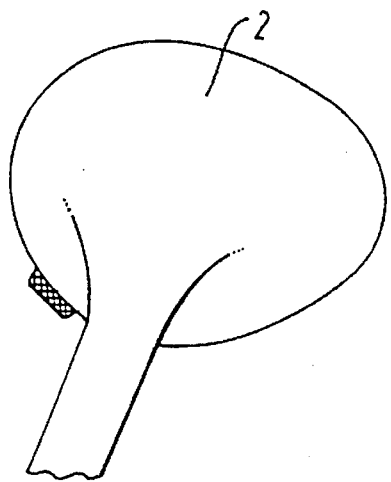

FIG. 1 shows the position of an ear microphone in the outer ear with a microphone unit 4 in contact with the bottom of tragus. The microphone unit 4 is mounted in a holder 2. If applied to the right ear, an ear microphone in a mirror-inverted embodiment is used. The microphone unit may e.g. be an accelerometer.

Figure 2:
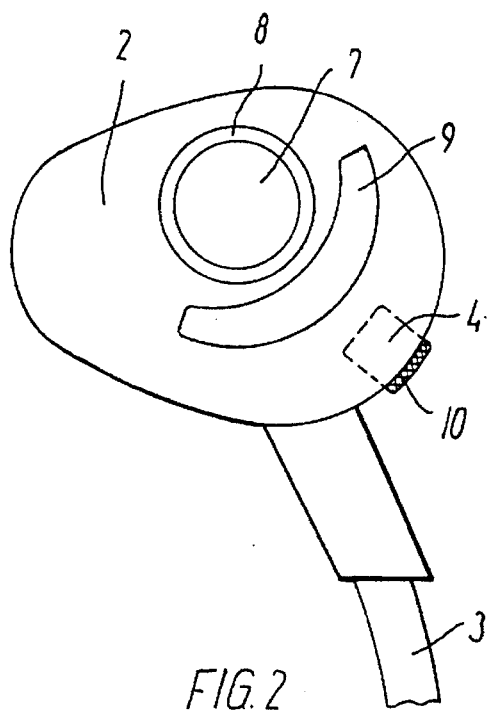
Figure 2A:
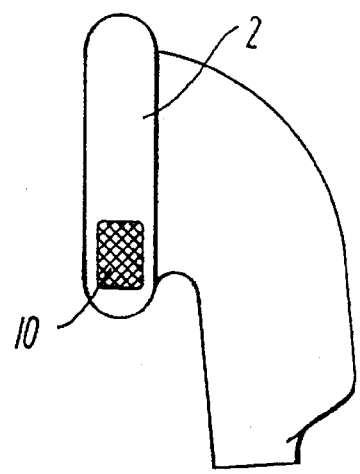

The position of the individual units in the ear microphone appears from FIG. 2, wherein a feeder cable 3 connects microphone unit 4 and a sound generator 7 to an external unit. The feeder cable 3 can be replaced by the use of wireless transmission. A heavy oscillation reducing insert 9 is embedded between microphone unit 4 and sound generator 7. The sound generator 7 is embedded in a thin layer of attenuation foam 8.

Figure 3:
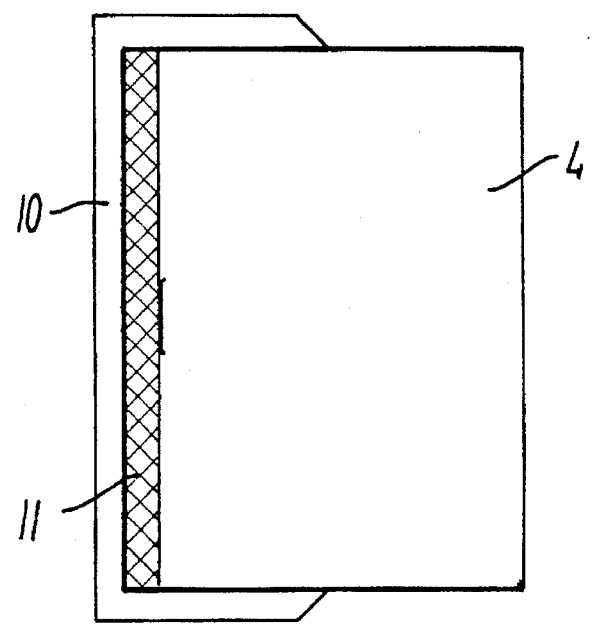
Figure 3A:
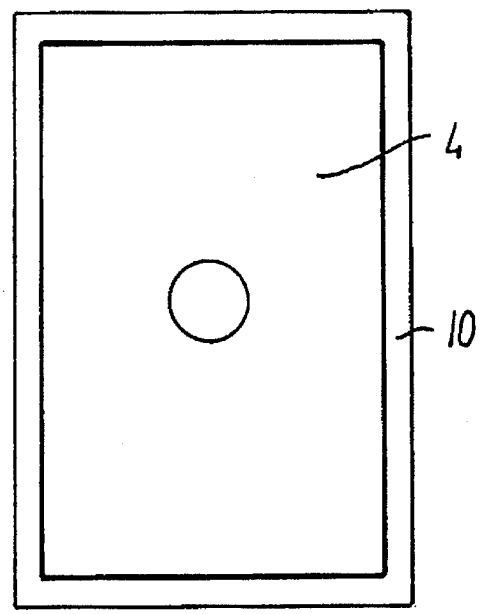
Figure 4:
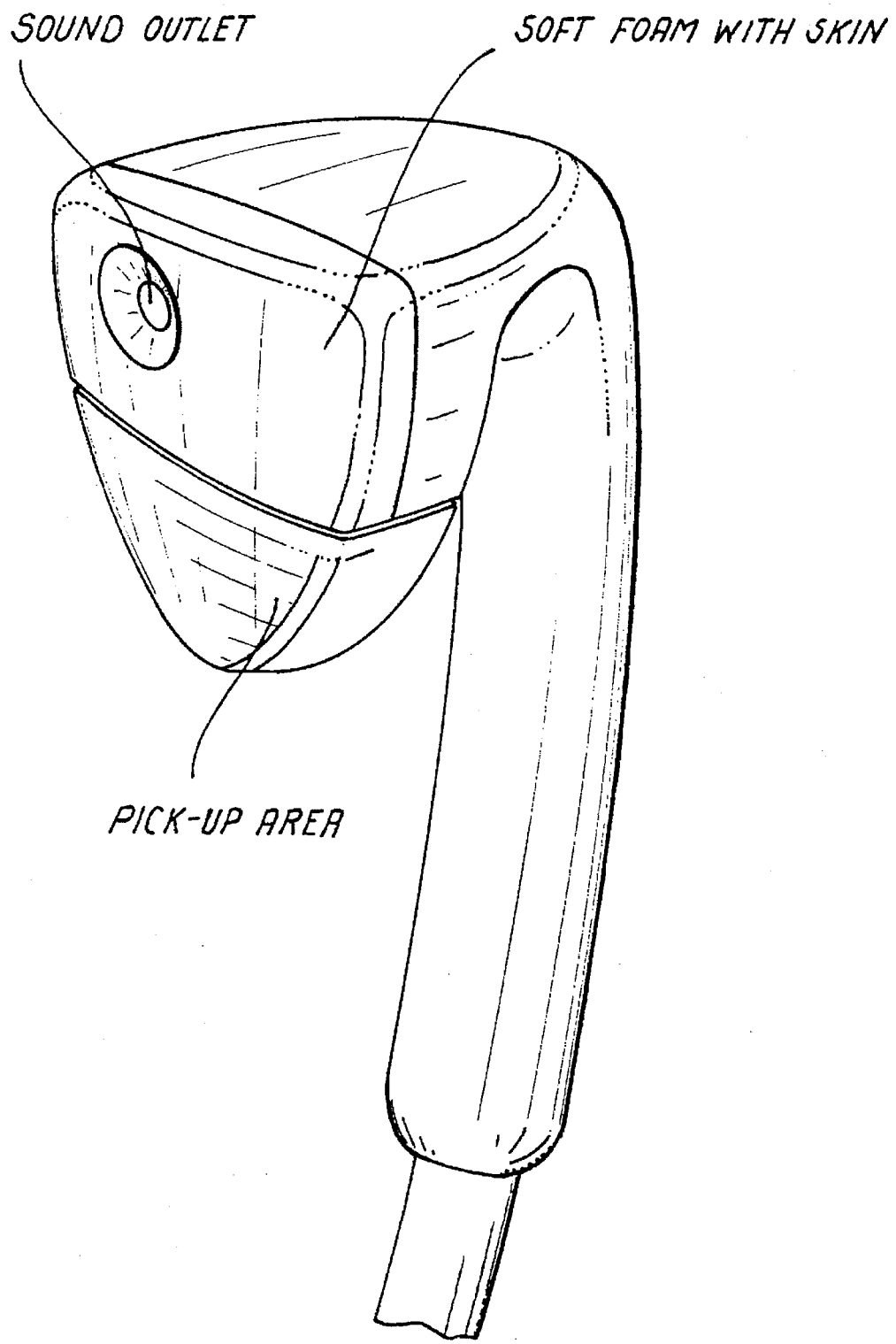

FIG. 3 shows the microphone unit 4 covered with sound transparent foam 11 and rubber 10 glued thereto for attenuation of airborne sound.

What is claimed is:

1. An ear microphone comprising a holder (2) including means for retention and disposition entirely in a wearer's outer ear region, the region being outside the wearer's auditory meatus; and a microphone unit (4) mounted in the holder for reception of speech sounds transmitted through tissue of the wearer, the microphone unit being insensitive to airborne sound signals, the microphone unit (4) being mounted in an edge of the holder (2) facing the bottom of the wearer's tragus, the microphone unit being pressed into the wearer's tragus in vibration transmitting tissue contact therewith when the holder is disposed in the wearer's outer ear region.

2. The ear microphone as claimed in 1, wherein the sound pressure sensitive face (wall) of the microphone unit (4) is substantially hermetically covered by a coating (10) of a flexible material which in use is in vibration transmitting contact with the tissue.

3. The ear microphone as claimed in 2, wherein said coating (10) is made of a rubber elastic material.

4. The ear microphone as claimed in claim 3, wherein said microphone unit (4) is positioned inside the holder (2) and is connected with a sound duct, said sound duct being substantially hermetically connected with said coating (10).

5. The ear microphone as claimed in claim 4, wherein said microphone unit (4) has a low-frequency cutoff.

6. The ear microphone as claimed in claim 1, wherein said microphone unit (4) is an accelerometer.

7. The ear microphone as claimed in claim 6 for use in a full duplex ear communication unit, wherein said microphone has a softly suspended (8) electroacoustic sound generator (7) mounted in a side of the holder (2) facing the auditory meatus.

8. The ear microphone as claimed in 7, wherein a vibration absorbing insert (9) is mounted in an area of the holder (2) between the sound generator (7) and the microphone unit (4).

9. The ear microphone as claimed in claim 7, wherein the entire holder is made substantially of a heavy vibration absorbing material having a density greater than 2 g/cm$^3$.

10. The ear microphone as claimed in claim 9, wherein said microphone comprises means for allowing the feeder cable (3) to be replaced by a wireless transmission.

11. The ear microphone as claimed in claim 1, wherein said microphone unit (4) is positioned inside the holder (2) and is connected with a sound duct said sound duct being substantially hermetically connected with said coating (10).

12. The ear microphone as claimed in claim 1, wherein said microphone unit (4) has a low-frequency cutoff.

13. The ear microphone as claimed in claim 1 including means for use in full duplex ear communication unit, wherein said microphone has a softly suspended (8) electroacoustic sound generator (7) mounted in a side of the holder (2) facing the auditory meatus.

14. The ear microphone as claimed in claim 5 including means for use in a full duplex ear communication unit, wherein said microphone has a softly suspended (8) electroacoustic sound generator (7) mounted in a side of the holder (2) facing the auditory meatus.

15. The ear microphone as claimed in claim 14, wherein a vibration absorbing insert (9) is mounted in an area of the holder (2) between the sound generator (7) and the microphone unit (4).

16. The ear microphone as claimed in claim 1, wherein the entire holder is made substantially of a heavy vibration absorbing material having a density greater that 2 g/cm$^3$.

17. The ear microphone as claimed in claim 1, wherein said microphone comprises means for allowing the feeder cable (3) to be replaced by a wireless transmission.

18. The ear microphone as claimed in claim 9, wherein said material is a metal.

19. The ear microphone as claimed in claim 16, wherein said material is a metal.

* * * * *